July 3, 1934.  E. F. WOODS  1,965,483
DRY LINE MARKER
Filed Dec. 20, 1932
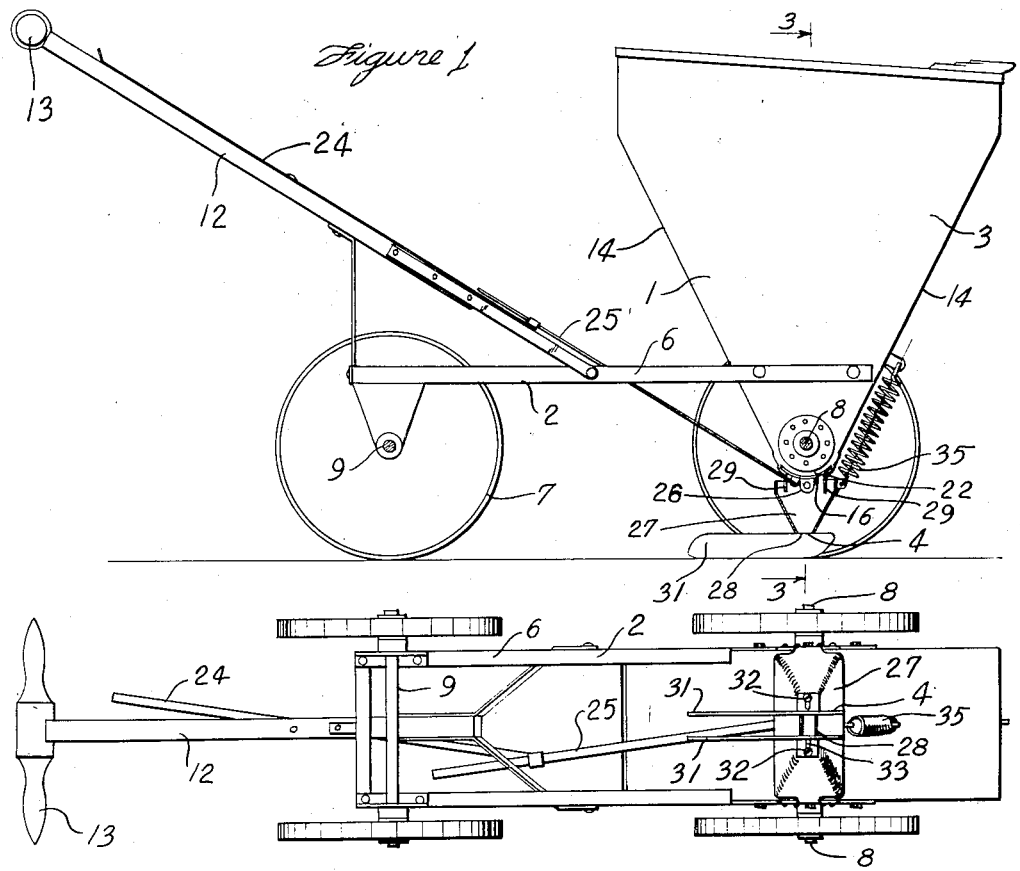
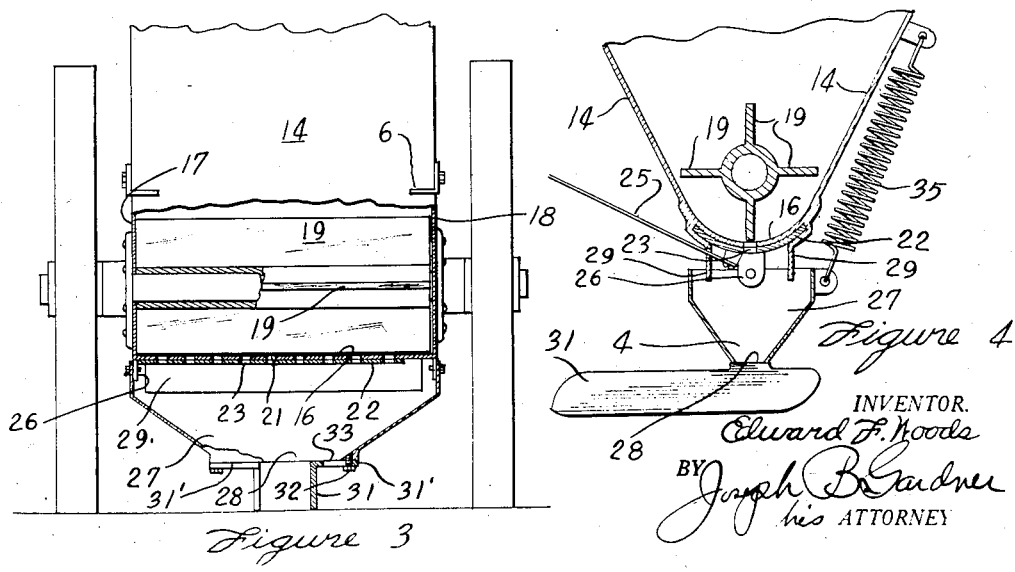
INVENTOR.
Edward F. Woods
BY Joseph B. Gardner
his ATTORNEY Patented July 3, 1934

1,965,483

UNITED STATES PATENT OFFICE 1,965,483

DRY LINE MARKER

Edward F. Woods, Oakland, Calif.

Application December 20, 1932, Serial No. 648,097

7 Claims. (Cl. 275—2)

The invention relates to a device for marking lines on a playing field or the like having a dirt or other rough surface, and relates more particularly to a device of this kind which makes the line, as the device is driven over the field, by depositing on the field surface a narrow strip of powdered lime or other desired dry granular substance.

An object of the invention is to provide a device of the character described which will form the line by depositing an even layer of the material on the field surface regardless of the roughness of the surface or the thickness of the deposit and will insure a line with sharp clean-cut edges and of uniform width throughout the length thereof.

Another object of the invention is to provide a device of the character described which affords the operator, during the formation of the line, a clear view of the manner in which the line is being made and the exact point at which the line is being formed.

A further object of the invention is to provide a dry line marking device which may be readily kept in any desired course, will operate to deliver material of an even texture at all times, and will permit adjustment as to the thickness of the line, while the device is in operation.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adapted within the scope of the invention as set forth in the claims.

Referring to the drawing:

Figure 1 is a side view, partly in section, of the device of my invention.

Figure 2 is a bottom view of the device as shown in Figure 1.

Figure 3 is a vertical transverse sectional view of the device taken on the line 3—3 of Figure 1.

Figure 4 is a vertical sectional view of the device taken at right angles to Figure 3.

As illustrated in the drawing, the device in the preferred embodiment comprises a body unit 1 mounted on a vehicle chassis 2 and made up in general of a marking material reservoir 3 and a material dispensing and guiding mechanism 4. The chassis as here shown includes a frame 6 carried on wheels 7 two of which are mounted on each of the axles 8 and 9 respectively located at the forward and rear end of the frame. Where, as in the present instance the device is arranged to be hand-propelled, a shaft 12 is fixed to the vehicle frame and has provided at the outer end thereof a handle 13.

As will be clear from Figure 1, the reservoir or hopper 4 is secured directly to the vehicle frame and is formed with downwardly converging front and rear walls 14 which join with a bottom member 16 extending under and curved in concentric relation with the front axle 8. The latter is fixed to the wheels so as to rotate therewith and extends through the side walls 17 and 18 of the hopper. Fixed to the axle 8 is a set of blades 19 which are arranged on rotation of the axle to move in close relation to the bottom member 16 so as to act not only to keep the material at the bottom of the hopper loose and active but to grind up and break any lumps therein.

The bottom of the hopper is formed with one or more outlet openings 21 and is held by the wheels in appreciably spaced relation from the surface on which the wheels rest. Arranged under the hopper so as to lie between the outlet portion and the surface of the field are means for controlling the discharge of the material from the hopper and for guiding the material and insuring its proper deposit on the field. For controlling the discharge of material from the hopper there is preferably provided and slidably held on the under side of the member 16 a closure plate 22 which as here shown conforms to the shape of member 16 and has provided therein openings 23 corresponding to the outlet openings 21. By means of a set of levers 24 and 25, the latter of which is connected to the plate and fulcrums on a fixed part of the hopper, the plate may be moved to place the opening 23 in or out of registration with the openings 21 and thereby regulate to any degree desired the amount of material discharging from the hopper or completely shut off any discharge whatever. The openings 21 and 23 are provided for practically the entire width of the hopper so that when the openings are in registration a continuous stream of material will be discharged from the hopper from practically one side thereof to the other. Positioned under the hopper and pivotally suspended therefrom is a receiving and distributing member 27 into which the material from the hopper is discharged and through which the material passes for deposit on the field surface. The receiver 27, as here shown, is pivoted to lugs 26 on the hopper at a point low enough and in such manner that free pivotal movement of the receiver will be permitted about an axis parallel to the line of the discharge openings. The walls of the receiver converge downwardly so that while the area at the top of the receiver is relatively large, the area at the bottom is relatively small and is defined by a rectangular or similar shaped opening 28 whose greater dimension is, in the present embodiment, transversely of the line of travel of the device. It will be evident that, due to the shape and position of the receiver, the material discharged thereinto from the hopper will for the most part converge toward the outlet opening 28 and leave the receiver in a concentrated mass, particularly so at the shorter sides thereof. Preferably skirt portions 29 extend from the hopper into the receiver so as to guide the material into the latter.

As an important part of the means used for insuring the proper deposit of the material on the field surface, there is provided a pair of spaced guide shoes 31 which are attached to the lower end of the receiver member. These shoes, as will be clear from Figures 2 and 4, extend from the member to the surface of the field and are designed to slidably engage such surface as the device is moved thereover. It will thus be clear that the shoes provide a guide for the material from the time the latter leaves the receiver until the instant it reaches the field surface, and in order that no material may escape from the receiver without discharging between the shoes, the latter are provided with angular extensions 31' which serve to close the portions of the outlet 28 located without the space between the shoes. Attachment between the shoes and receiver is conveniently effected by means of bolts 32 or the like extending through the extensions 31'. Preferably the bolts engage in slots 33 in the extensions so that the space between the shoes may be varied to thereby provide any width of line desired.

The shoes are preferably quite long, with a short portion projecting forwardly of the outlet 28 and a longer portion extending rearwardly thereof. By reason of this design of the shoes and the relative positioning of the portions thereof there will be no danger of the material piling up under the outlet and escaping from between the shoes either forwardly or rearwardly of the outlet. Of particular importance is the feature of the longitudinal extension of the shoes rearwardly, since the shoes are caused to remain in guiding relation to the material long after the material has been discharged from the receiver outlet and deposited on the field surface. The foregoing feature is quite important, particularly in the present embodiment, since a concentration of material is arranged to be effected at the side edges of the line in order to insure, as previously explained, clean cut and well defined lines.

By reference to Figure 1, it will be seen that when an operator is positioned at the handle and is operating the device, he will have a clear view of the rear shoe portions and of the material as it leaves the outlet and deposits between the shoes. In this way, the operator can see the line while it is being formed and may promptly make any adjustment in the application of the material or in the direction of movement of the device so as to insure the production of a well formed and accurately drawn line.

It will be evident that since the unit made up of the receiver and shoes is pivotally mounted and with the greater weight disposed rearwardly of the pivot point, effective engagement of the shoe with the field will be had regardless of any irregularities and waviness in the field surface. If desired, a spring 35 may be connected to the hopper and receiver unit to increase the adaptability of the shoes to most effective surface engagement.

I claim:

1. In a device of the character described, a material hopper having a controlled outlet positioned to overlie in spaced relation the surface to be marked, and a guiding unit including transversely spaced shoes extending longitudinally of the device and arranged for engagement with said surface and to receive therebetween and confine on said surface the material discharged from said outlet, said unit together with said shoes being pivotally mounted to oscillate relative to said hopper.

2. In a device of the character described, a truck, a material container thereon having an outlet arranged to overlie in spaced relation the ground surface to be marked, a guiding unit mounted to oscillate relative to the container outlet portion and to receive the material therefrom, said unit including transversely spaced ground-engaging portions extending longitudinally of the truck and arranged to engage and confine therebetween the material discharged from the container outlet, said engaging portions being designed to engage the ground substantially from the point at which the material is received therebetween to a point spaced rearwardly from the first point.

3. In a device of the character described, a truck, a material container thereon having a controlled outlet in vertical spaced relation to the ground surface to be marked, a material receiving and guiding unit having an inlet opening for the reception of the material from said outlet and having a discharge opening normally closer to said surface than is said container outlet, said unit having ground engaging portions for confining the material on the ground on discharge from said receiver opening and being resiliently mounted for oscillation relative to said container to thereby urge said portions into constant contact with the ground.

4. In a device of the character described, a truck, a material container thereon having a controlled outlet, a guide member having opposed ground engaging portions arranged to receive therebetween the material from said outlet and to control the spread thereof after deposit on the ground, and spring means urging said portions into contact with the ground.

5. In a device of the character described, a truck, a material container thereon having a controlled outlet providing a stream of greater width transversely of the truck than longitudinally thereof, a receiver member mounted to move relative to the container and to receive therefrom the material from the outlet, said receiver having a discharge opening and walls converging from the inlet to said discharge opening, and transversely adjustable ground engaging portions fixed relative to the receiver and arranged to receive between said portions the material discharging from said opening.

6. In a device of the character described, a truck, a material container thereon having a controlled outlet providing a stream of greater width transversely of the truck than longitudinally thereof, a receiver member pivoted to move relative to the container and to receive therefrom the material from the outlet, said receiver having a discharge opening and walls converging from the inlet to said discharge opening, transversely adjustable ground engaging portions fixed relative to the receiver and arranged to receive between said portions the material discharging from said opening, and means to vary the width of said opening.

7. A line marker comprising, a material hopper movable over a surface to be marked, and a material guiding member arranged for receiving material from said hopper and including opposed surface engaging portions defining therebetween a discharge orifice slidably contacting said surface for depositing the material thereon, said member being pivotally mounted with respect to said hopper to permit constant engagement thereof with the surface in instances where the latter is uneven.

EDWARD F. WOODS.